United States Patent

Castaigne

[11] 3,901,941
[45] Aug. 26, 1975

[54] NEW OXYACETIC ETHER DERIVATIVES OF ORTHO-THYMOTIC ESTERS

[75] Inventor: Albert Rene Castaigne, Toulouse, France

[73] Assignee: Centre d'Etudes pour l'Industrie Pharmaceutique, Toulouse, France

[22] Filed: July 6, 1973

[21] Appl. No.: 377,030

[30] Foreign Application Priority Data
July 20, 1972 France .................. 72.26160

[52] U.S. Cl...... 260/472; 260/427.2 B; 260/293.82; 260/473 IG; 424/248; 424/267; 424/309
[51] Int. Cl.² ................................. C07C 101/42
[58] Field of Search................ 260/472, 473 IG

[56] References Cited
OTHER PUBLICATIONS

Finar; I. L., *Organic Chemistry* (Vol. 1)–1963, pub. by Richard Clay & Co.-London (QD251F6), pp. 196.

*Primary Examiner*—Robert Gerstl
*Assistant Examiner*—L. A. Thaxton
*Attorney, Agent, or Firm*—Young & Thompson

[57] ABSTRACT

New derivatives of the formula:

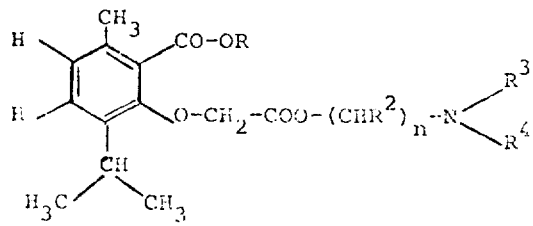

in which R represents a lower alkyl radical having 1–4 carbon atoms; $n$ is an integer from 1 to 4; $R^2$ is hydrogen or a lower alkyl radical, the various $R_2$'s not being necessarily identical when $n$ is higher than 1; $R^3$ and $R^4$, which may be the same or different, are hydrogen or a lower alkyl radical or, together with the nitrogen atom to which they are attached, form a heterocyclic ring which may contain another heteroatom and their pharmaceutically acceptable acid addition salts. They are useful, in particular, as therapeutic compositions having cranial and peripheral vasodilatator, coronary dilatator, local anesthetic and anti-tussive properties.

6 Claims, No Drawings

NEW OXYACETIC ETHER DERIVATIVES OF ORTHO-THYMOTIC ESTERS

This invention relates to new ortho-thymotic acid derivatives, to a process for their preparation and to their applications, particularly in human and veterinary medicine.

The new compounds of this invention are those having the general formula:

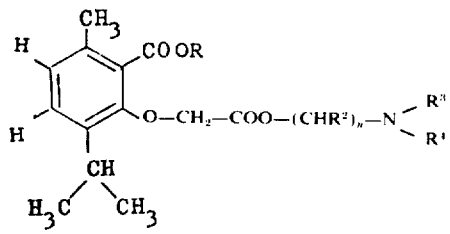

in which R represents a lower alkyl radical having 1–4 carbon atoms; $n$ is an integer from 1 to 4; $R^2$ considered individually in each radical —$(CHR^2)$— is hydrogen or a lower alkyl radical having 1–6 carbon atoms; $R^3$ and $R^4$, which may be the same or different, are hydrogen or a lower alkyl radical having 1–6 carbon atoms or, together with the nitrogen atom to which they are attached, form a heterocyclic ring optionally containing another heteroatom and their pharmaceutically acceptable acid addition salts.

It is apparent from the above definition that the various symbols $R^2$ are not necessarily identical when $n$ is higher than 1.

Among the acid addition salts, may be mentioned the salts formed with inorganic acids (hydrochloric, sulfuric, phosphoric acids) or organic acids (oxalic, succinic, citric acids).

The invention includes also within its scope a process for the preparation of said derivatives, comprising reacting ortho-thymotic acid having the formula:

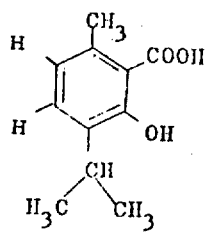

with an esterifying agent of the formula $A(R)_a$ in which R has the above defined meaning, A is an anion and $a$ is the valence of said anion, to give the derivative of the formula (II)

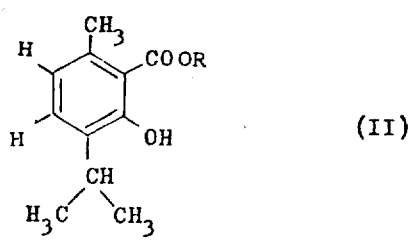

and then reacting derivative (II) with a lower alkyl halogenoacetate Z—$CH_2$—COO—Alk in which Z is halogen and Alk a lower alkyl group, to give the esterified oxyacetic derivative having the formula:

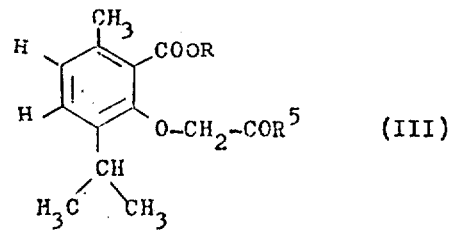

in which $R^5$ is a lower alkoxy radical, hydrolyzing group $COR^5$ to a carboxyl group, esterifying same with an aminoalcohol of the formula

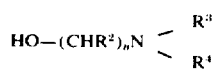

in which $R^2$, $R^3$, $R^4$ and $n$ have the above defined meanings and, if desired, salifying resulting derivative of the formula (I).

Said esterification is advantageously effected by means of an alkyl sulfate. It is preferably conducted within boiling acetone in the presence of sodium acid carbonate.

Treatment of derivative (II) with the lower alkyl halogenoacetate is effected by heating the reagents within a solvent, such as dimethylformamide, in the presence of a base, such as potassium carbonate, taking up the hydrohalic acid released.

To hydrolyse selectively the $COR^5$ group of resulting compound (III), the reaction is conducted in alkaline medium at moderate temperature.

To esterify the resulting acid (compound (III), $R^5$ = OH) with the aminoalcohol, it is convenient to first convert it to an acid chloride (compound (III), $R^5$=Cl) with thionyl chloride and to react said acid chloride with the aminoalcohol under usual esterification conditions.

All compounds (III), whether $R^5$ is a lower alkoxy group, a hydroxy group or chlorine, are new compounds also encompassed within the scope of this invention.

The following non limiting examples are given to illustrate the preparation of compounds of this invention.

Examples A and B relate to the preparation of esters (II) used as raw materials in subsequent examples.

EXAMPLE A

Synthesis of methyl ortho-thymotate

To a two-necked flask provided with a mehchanical stirrer and with an ascending cooler provided overhead with a calcium chloride tube are added 48.55 g (0.25 mole) ortho-thymotic acid, 35.28 g (0.28 mole) methyl sulfate, 25.2 g (0.30 mole) hydrogen sodium carbonate and 200 ml anhydrous acetone.

The mixture is boiled during 15 hours, with continuous stirring.

After cooling, the solution is filtered and the filter is ashed with acetone. The filtrate and washing liquors re evaporated in vacuo. The residue, dissolved in ther, is washed with a saturated aqueous sodium acid arbonate solution, and then with water until neutral. The ether phase is separated and is then dried over odium sulfate and evaporated. The resulting oily residue is then distilled in vacuo, and the fraction distilling t 88°–89°C under 0.5 mm mercury is collected (Yield: 8%).

EXAMPLE B

Synthesis of ethyl ortho-thymotate

This ester is obtained as its methyl homolog (Example A) by mixing at first 48.55 g (0.25 mole) ortho-thymotic acid, 45.17 g (0.28 mole) ethyl sulfate and 5.2 g sodium acid carbonate in 200 ml anhydrous acetone.

The fraction distilling at 88°–24 89°C under 0.5 mm Hg is collected (Yield: 78%).

EXAMPLE 1 a. Synthesis of ethyl (6-isopropyl-2-methoxycarbonyl-3-methyl)-phenoxyacetate

To a 1 liter three-necked flask provided with a mechanical stirrer and with a cooler provided overhead with a calcium chloride trap are added 100 g (0.48 mole) methyl ortho-thymotate, 80.16 g (0.48 mole) ethyl bromoacetate, 128.48 g (0.96 mole) anhydrous potassium carbonate and 200 ml anhydrous dimethyl formamide.

The mixture is heated 18 hours at 55°C. After cooling, the solution is filtered and the precipitate is washed with acetone. The filtrate to which the washing acetone is added is evaporated and the residue is dissolved in ether.

The ether phase is washed with water, dried over anhydrous sodium sulfate, filtered, evaporated and distilled in vacuo, to give 124.55 g (Yield: 88%) of a derivative having a boiling point (under 0.1 mm Hg) of 40°C.

b. Synthesis of (6-isopropyl-2-methoxycarbonyl-3-methyl)-phenoxyacetic acid.

To a 1 liter flask are added 80 g (0.272 mole) ethyl 6-isopropyl-2-methoxycarbonyl-3-methyl)-phenoxyacetate, 285 ml N NaOH and 180 ml ethanol. The resulting pink solution is left at room temperature during 48 hours after which the ethanol is evaporated in vacuo. The remaining aqueous phase is extracted with ether, it is then made acidic and again extracted with ether.

The ether extracts are dried over anhydrous sodium sulfate and are then filtered and evaporated, to give 72.58 g (Yield: 100%) of an oil which crystallizes very rapidly and has a melting point (Koefler block) of 90°–92°C.

c. Synthesis of (6-isopropyl-2-methoxycarbonyl-3-methyl)-phenoxyacetic acid chloride.

To a 100 ml flask are added 6 g (0.0266 mole) (6-isopropyl-2-methoxycarbonyl-3-methyl)-phenoxyacetic acid, 12 ml thionyl chloride and 2 drops dimethylformamide. The mixture is refluxed during one half hour and is then evaporated in vacuo. The resulting acid chloride is used directly in the following step.

d. Synthesis of N-dimethylaminoethyl (6-isopropyl-2-methoxycarbonyl-3-methyl)-phenoxyacetate (Derivative No. 1)

In a three-necked flask of 250 ml capacity, provided with a magnetic stirrer, a cooler provided overhead with a calcium chloride trap, and a dropping funnel are mixed 2.37 g (0.0266 mole) dimethylaminoethanol and 70 ml chloroform and the acid chloride obtained above, dissolved in 35 ml anhydrous ether, is then added dropwise thereto. When the addition is complete, the reaction mixture is stirred 15 minutes at room temperature, 100 ml of 5% hydrochloric acid are added thereto and the mixture is again stirred vigorously during 10 minutes. The aqueous phase is decanted, made alkaline with 2N sodium hydroxide and extracted with ether.

The ether phase is dried over anhydrous sodium sulfate, filtered and evaporated in vacuo, to give 5.13 g of an oil which is directly converted to the hydrochloride. After recrystallization from ethyl acetate-ethanol, there are obtained crystals having a melting point (Koefler block) of 138°–140°C.

EXAMPLE 2

Synthesis of piperidinoethyl (6-isopropyl-2-methoxycarbonyl-3-methyl)-phenoxyacetate (Derivative No. 2)

In a three-necked flask of 500 ml capacity provided with a magnetic stirrer, a cooler provided overhead with a calcium chloride trap, and a dropping funnel are mixed 4.77 g (0.0376 mole) piperidinoethanol in 100 ml chloroform. The acid chloride (obtained as in Example 1c from 10 g (6-isopropyl-2-methoxy-carbonyl-3-methyl)phenoxyacetic acid) dissolved in 50 ml ether is then added thereto dropwise. When addition of the acid chloride is complete, the reaction mixture is stirred 15 minutes at room temperature after which 100 ml 5% hydrochloric acid are added thereto, and the reaction mixture is stirred vigorously during 10 minutes. The aqueous phase is decanted, made basic with 2N sodium hydroxide and extracted with ether. The ether phases are dried over anhydrous sodium sulfate, filtered and evaporated in vacuo, to give 12.22 g of an oil which is directly converted to the hydrochloride. Recrystallization from ethyl acetate-ethanol gives 9.17 g of crystals having a melting point (Koefler block) of 140°C.

Other derivatives of the formula (I) were obtained by synthesis. The characteristics of some of said derivatives are given below, for illustrative purposes:

N-dimethylaminoethyl (6-isopropyl-2-ethoxycarbonyl-3-methyl)-phenoxyacetate whose oxalate, recrystallized from ethyl acetate-ethanol has a melting point of 120°C (Derivative No. 3).

N-diethylaminoethyl (6-isopropyl-2-methoxycarbonyl-3-methyl)-phenoxyacetate whose oxalate, recrystallized from ethyl acetate, has a melting point of 110°–112°C (Derivative No. 4).

Morpholinoethyl (6-isopropyl-2-methoxycarbonyl-3-methyl)-phenoxyacetate whose oxalate, recrystallized from ethyl acetate-ethanol has a melting point of 140°–142°C (Derivative No. 5).

N-dimethylaminoisopropyl (6-isopropyl-2-methoxycarbonyl-3-methyl)-phenoxyacetate whose hydrochloride, recrystallized from ethyl acetate-ethanol, has a melting point of 127°–129°C (Derivative No. 6).

N-dimethylaminopropyl (6-isopropyl-2-methoxycarbonyl-3-methyl)-phenoxyacetate whose hydrochloride, recrystallized from ethyl acetate-ethanol, has a melting point of 118°–120°C (Derivative No. 7).

The results of toxicological and pharmacological tests reported below demonstrate the activities of the derivatives of this invention, particularly their cranial and peripheral vasodilatator, coronary dilatator, local anesthetic and anti-tussive activities.

Thus, the invention includes also within its scope a therapeutic composition having in particular cranial and peripheral vasodilatator, coronary dilatator, local anesthetic and anti-tussive actions, comprising, as active ingredient, a derivative of the formula (I) or a pharmaceutically acceptable salt thereof and a therapeutically administrable carrier.

I. TOXICOLOGICAL INVESTIGATION

The low toxicity and the good tolerance of the derivatives of this invention are apparent from said investigation.

For indicative purposes the LD 50/24 hrs, determined according to the method of Miller and Tainter in mice, for the intravenous route per kg of body weight is 135 mg for derivative 1, 50 mg for derivative 2, 130 mg for derivative 3, 82 mg for derivative 4, 145 mg for derivative 5, 42 mg for derivative 6 and 90 mg for derivative 7.

II. PHARMACOLOGICAL INVESTIGATION a. cranial and peripheral vasodilatator action On intravenous injection at a dosage of 10 mg/kg of body weight, the derivatives of this invention produce a marked cranial and peripheral vasodilatation. Said action is evidenced by the rheographic study: this study shows an increase of the amplitude of the rheographic recording and, therefore, an increase of the blood rate of flow due to a vasodilatation in the area under consideration.

b. coronary dilatator action

This experimentation, effected with the normal isolated heart of rabbit according to Langendorff's technique (GAZET du CHATELIER G. and STRASKY E., Ann. Pharm. Fr., 1956, 14, 11, 677–685) shows that addition of the derivatives of this invention to the nutrient perfusion liquid produces an increase of 40–60% of the coronary rate of flow and, thus, a marked vasodilatation at the level of the coronary arteries.

c. local anesthetic action

This action was investigated by means of the local surface anesthesia method (disappearance of the oculo-palpebral reflex in rabbit, according to Régnier, Thèse Med., Paris, 1929; Roland, Thèse Pharm., Toulouse, 1957 — Hazard and Coll., Masson et Cie., Ed. 1963, p. 58–59) and by means of the local infiltration anesthesia method of BULBRING & WAJDA, J. Pharmacol. Exptl. Therap., 1945, 85, 78, 84.

This investigation shows that the derivatives of this invention provide anesthesia percentages within the range from 50 to 60%.

d. anti-tussive action (Method of Salle-Brunnaud, Arch. Int. Pharmacodyn., 1-2, 120–12, 1960).

The guinea-pigs, placed in a sealed enclosure, are submitted, prior and after treatment with the derivatives of this invention, to the action of a cough-producing agent (aerosol containing one third ammonia) during one minute and then receive pulsed air during 2 minutes.

The coughing motions are recorded on a cylinder by means of a Marey cell. The anti-tussive activity of the test materials is evaluated as a function of the decrease of the coughing motions in the animals of the treated lot with respect to the reference lot. Said activity is, on the average, 70% 30 minutes after treatment and 58% 90 minutes after treatment.

The cranial and peripheral vasodilatator, coronary dilatator, local anesthetic and anti-tussive activities of the derivatives of this invention, and also their low toxicity and good tolerance are apparent from the results of said investigations.

The therapeutic composition of this invention is advantageously formulated for oral administration as tablets, coated tablets, capsules, syrups and drops. It may also be formulated as injectable solutions or as suppositories.

Each unit does may advantageously contain 20–250 mg active ingredient, the daily dosage regimen varying within a wide range from 20 mg to 2,000 mg.

Non limiting examples of pharmaceutical formulations of the composition of this invention are given below.

| EXAMPLE 3 | Tablets | |
|---|---|---|
| | Derivative No. 3 | 0.100 g |
| | Lactose | 0.015 g |
| | Starch | 0.010 g |
| | Magnesium stearate | 0.005 g |
| | Polyvinyl pyrrolidone | 0.010 g |
| | Aluminum tartrazine lacquer | traces |
| EXAMPLE 4 | Coated Tablets | |
| Core | (Derivative No. 1 | 0.080 g |
| | (Lactose | 0.010 g |
| | (Starch | 0.010 g |
| | (Talc | 0.005 g |
| | (Polyvinyl pyrrolidone | 0.010 g |
| | (Magnesium stearate | 0.005 g |
| Coating | (Sugar | 0.015 g |
| | (White gelatin | 0.010 g |
| | (Tricalcium phosphate | 0.003 g |
| | (Gum arabic | 0.005 g |
| | (Tartrazine | traces |
| | (White wax | 0.005 g |
| | (Carnauba wax | 0.002 g |
| EXAMPLE 5 | Capsules | |
| | Derivative No. 2 | 0.075 g |
| | Talc | 0.005 g |
| | Magnesium stearate | 0.005 g |
| EXAMPLE 6 | Drops | |
| | Derivative No. 5 | 1.5 g |
| | Flavoured excipient, q.s. to make | 30 ml |
| EXAMPLE 7 | Injectable solution | |
| | Derivative No. 4 | 0.075 g |
| | Isotonic solvent, q.s. to make | 3 ml |
| EXAMPLE 8 | Suppositories | |
| | Derivative No. 7 | 0.100 g |

Semi-synthetic glycerides, q.s. for 1 suppository

The composition of this invention may be used for therapeutic purposes for its cranial and peripheral vasodilatator, coronary dilatator, local anesthetic and anti-tussive properties.

It is used as a local anesthetic in surgery, traumatology, rheumatology and oto-rhino-laryngology.

In view of its cranial, peripheral and coronary dilatator properties, it is administered in the treatment of cardiovascular conditions.

Finally, it produces rapid sedation of coughing, whatever its etiology, while being free from unpleasant side effects.

Having now described my invention what I claim as new and desire to secure by Letters Patent is:

1. A compound selected from the oxyacetic ether derivatives of ortho-thymotic esters of the formula:

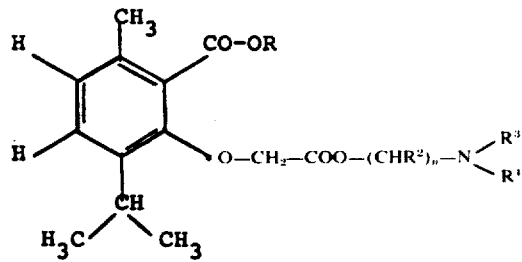

(I)

in which R is a lower alkyl having 1–4 carbon atoms; $n$ is an integer from 1 to 4; $R^2$ considered individually in each radical —($CHR^2$) — is selected from hydrogen and the lower alkyl radicals having 1–6 carbon atoms; $R^3$ and $R^4$ are individually selected from hydrogen and the lower alkyl radicals having 1–6 carbon atoms; and their pharmaceutically acceptable acid addition salts.

2. N-dimethylaminoethyl (6-isopropyl-2-methoxycarbonyl-3-methyl)-phenoxyacetate and its hydrochloride.

3. N-dimethylaminoethyl (6-isopropyl-2-ethoxycarbonyl-3-methyl)-phenoxyacetate and its oxalate.

4. N-diethylaminoethyl (6-isopropyl-2-methoxycarbonyl-3-methyl)-phenoxyacetate and its oxalate.

5. N-dimethylaminoisopropyl (6-isopropyl-2-methoxycarbonyl-3-methyl)-phenoxyacetate and its hydrochloride.

6. N-dimethylaminopropyl (6-isopropyl-2-methoxycarbonyl-3-methyl)-phenoxyacetate and its hydrochloride.

* * * * *